(12) United States Patent
Kunz-Mujica

(10) Patent No.: US 7,264,427 B1
(45) Date of Patent: Sep. 4, 2007

(54) DRILL BIT APPARATUS

(76) Inventor: Cheryl Kunz-Mujica, P.O. Box 117, Norwood, NJ (US) 07648

( * ) Notice: Subject to any disclaimer, the term of this patent is extended or adjusted under 35 U.S.C. 154(b) by 245 days.

(21) Appl. No.: 10/288,955

(22) Filed: Nov. 6, 2002

Related U.S. Application Data

(60) Provisional application No. 60/331,019, filed on Nov. 6, 2001.

(51) Int. Cl.
*B23B 51/02* (2006.01)
(52) U.S. Cl. ........................ 408/202; 408/212
(58) Field of Classification Search ............... 408/202, 408/212–123, 223–226, 228, 233, 713
See application file for complete search history.

(56) References Cited

U.S. PATENT DOCUMENTS

| | | | | |
|---|---|---|---|---|
| 2,782,824 A | * | 2/1957 | Robinson | 408/223 |
| 2,981,127 A | * | 4/1961 | Ransom | 408/229 |
| 3,997,279 A | * | 12/1976 | Porter | 408/211 |
| 4,480,951 A | * | 11/1984 | Regensburger | 408/224 |
| 4,527,449 A | * | 7/1985 | Sydlowski et al. | 76/108.1 |
| 4,826,367 A | * | 5/1989 | Kandarian | 408/225 |
| 4,962,820 A | * | 10/1990 | Fischer | 175/220 |
| 5,061,127 A | * | 10/1991 | Thomas | 408/212 |
| 5,291,806 A | * | 3/1994 | Bothum | 76/102 |
| 5,649,796 A | * | 7/1997 | Durney | 408/211 |
| 5,882,151 A | * | 3/1999 | Wirth et al. | 408/110 |
| D455,466 S | * | 4/2002 | Budget | D21/648 |
| 2003/0133765 A1 | * | 7/2003 | Capriotti | 408/224 |

FOREIGN PATENT DOCUMENTS

| | | | |
|---|---|---|---|
| EP | 171830 A1 | * | 2/1986 |
| EP | 395335 A1 | * | 10/1990 |
| GB | 2271948 A | * | 5/1994 |

* cited by examiner

*Primary Examiner*—Monica Carter
*Assistant Examiner*—J Williams
(74) *Attorney, Agent, or Firm*—Kreig DeVault LLP

(57) ABSTRACT

A drill bit apparatus having a central shaft and an annular collar mounted thereon. The central shaft is coaxially positioned within the annular collar. The central shaft has a bit end and a cutting tool end. The annular collar is spaced between the bit and cutting tool end. The bit is configured for releasable securement in a chuck of a drill or drill press. The cutting tool end is configured to securably receive a cutting tool therein. The cutting tool lower portion has a central bore cutter essentially coaxial with the shaft. The upper portion of the tool comprises a counter bore cutter having a width greater than the central bore cutter. The counter bore cutter extends below a lower surface of the annular collar a distance less than the distance the central bore cutter extends below the lower surface.

20 Claims, 6 Drawing Sheets

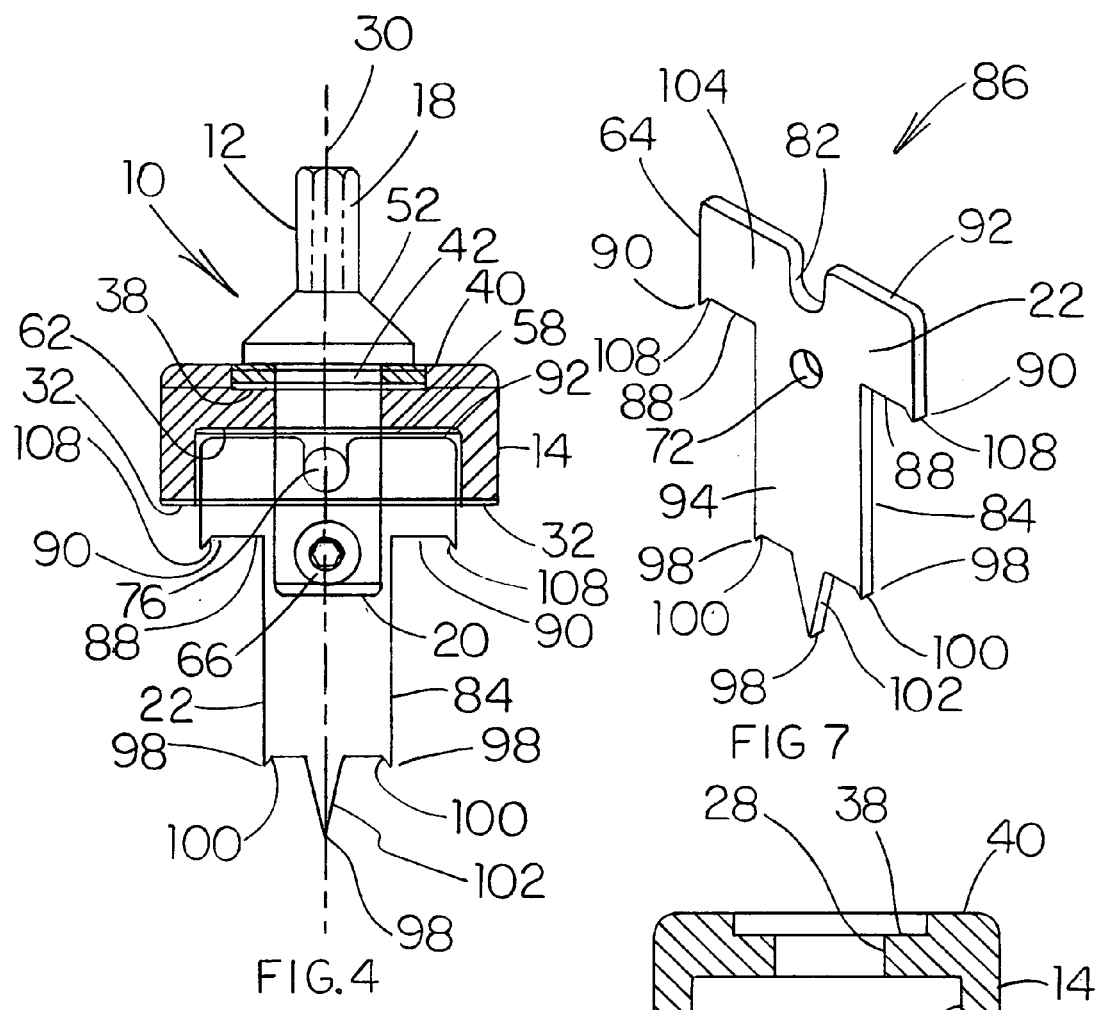
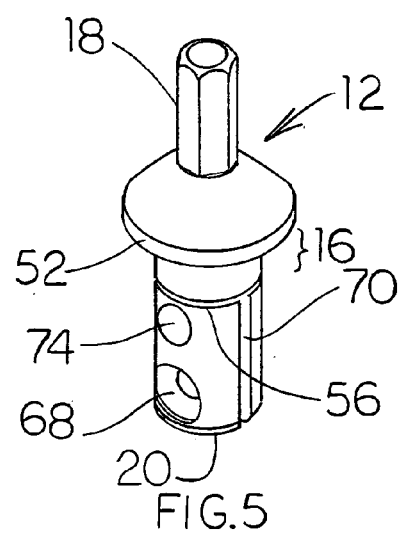

DRILL BIT APPARATUS

This application claims priority based on U.S. Provisional Patent Application Ser. No. 60/331,019, entitled "Wood Anchor Bit Apparatus," and filed Nov. 6, 2001.

BRIEF DESCRIPTION OF THE DRAWINGS

FIG. 4 is a cross-sectional view of the drill bit apparatus showing the relationship between component parts;

FIG. 5 is a detail view of the central shaft;

FIG. 6 is a cross-sectional view of the collar;

FIG. 7 is a perspective view of the cutting tool;

FIG. 9 is a top view of a C-clip; and

DETAILED DESCRIPTION OF EMBODIMENTS OF THE INVENTION

Figure 1:
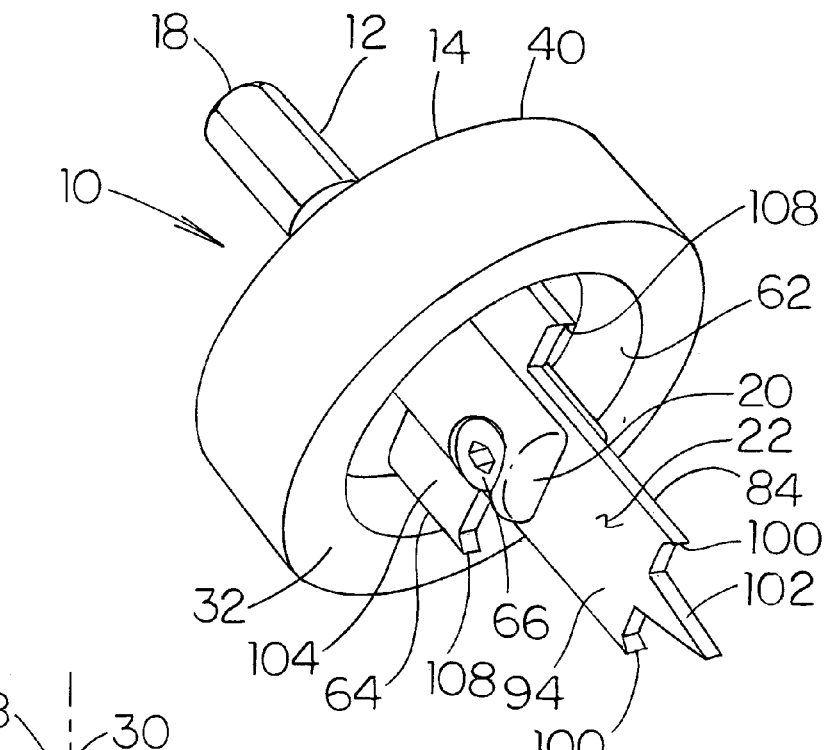
FIG. 1 is a perspective view of the drill bit apparatus showing the annular collar statically mounted to the central shaft.

As shown in FIGS. 1–9, a drill bit apparatus 10 has central shaft 12 and an annular collar 14 mounted around a portion 16 of the central shaft 12. One end 18 of the central shaft 12 is configured to be releaseably secured within the chuck of a drill or drill press (not shown). The other end 20 of the central shaft 12 is configured to securably receive a cutting tool 22 used to bore counter sunk apertures 24 into a surface 26. The central shaft 12 is positioned within a shaft aperture 28 extending axially through the annular collar 14, the annular collar, and the central shaft being thus aligned to share an axial centerline 30 and be coaxial. The annular collar 14 has a lower surface 32 that serves as a stop for permitting the drill bit apparatus 10 to bore counter sunk apertures 24 only to a certain depth.

Figure 1A:
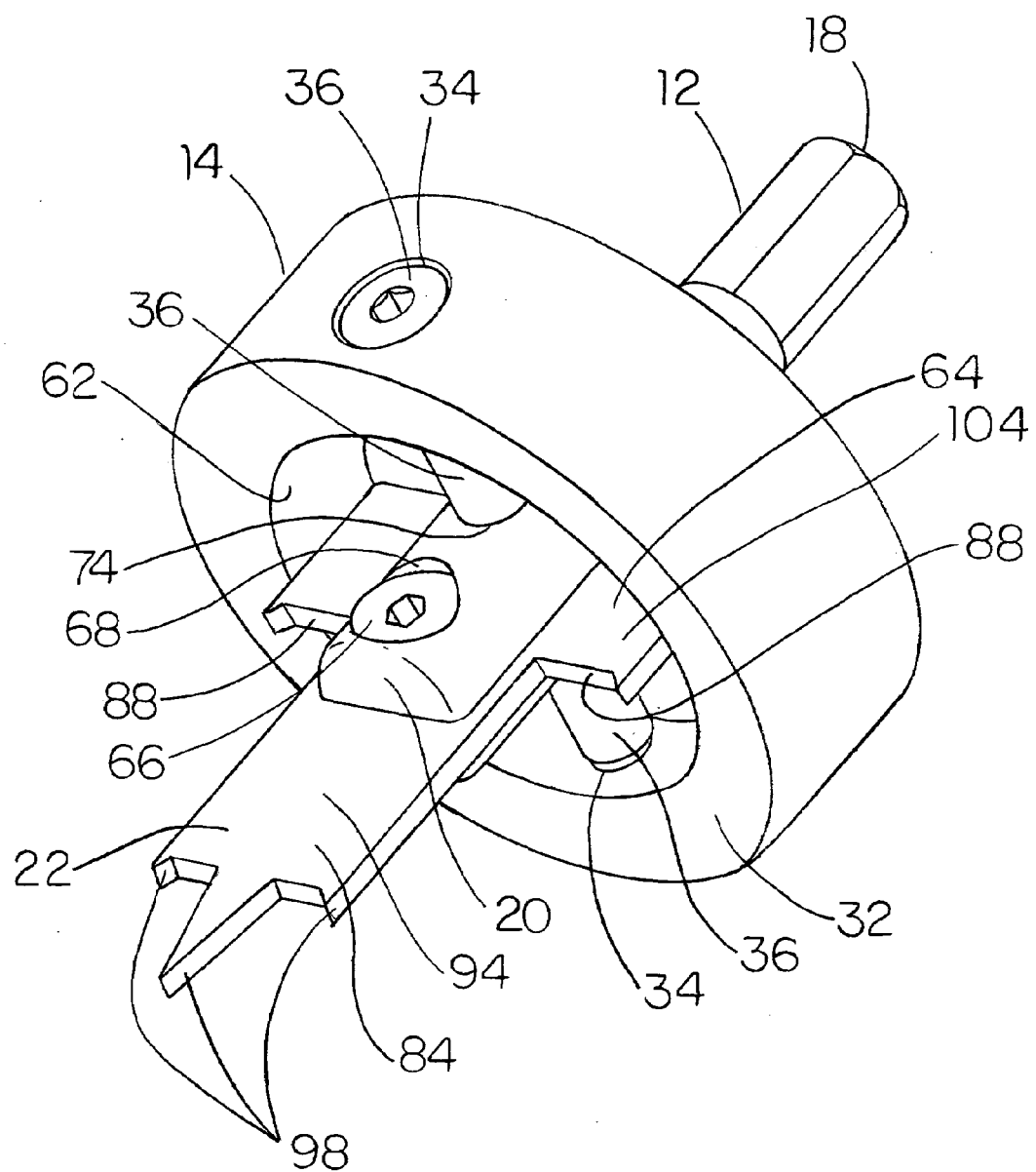
FIG. 1A is a perspective view of another version of the drill bit apparatus showing the annular collar rigidly mounted to the central shaft.

As shown in FIG. 1A, the annular collar 14 may be rigidly mounted to the central shaft 12 such that the annular collar 14 rotates with the central shaft 12 when it is releasably secured within a drill chuck and rotated by a drill (not shown). In one embodiment of such a configuration, both the annular collar 14 and the central shaft 12 have a radial aperture 34 which, when aligned, receives a radial fastener 36 such as a threaded bolt, pin, dowel or rivet.

Figure 2:
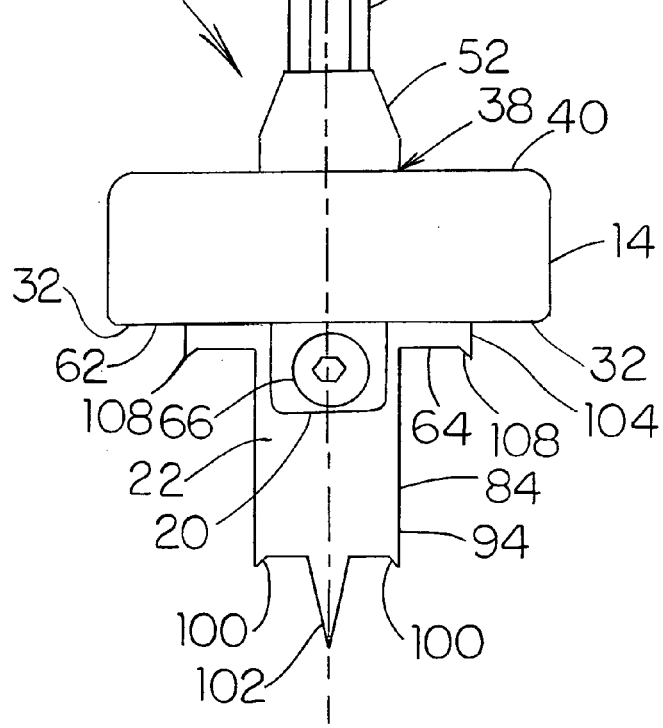
FIG. 2 is a side elevation view of the drill bit apparatus.

Alternatively, the annular collar 14 may be rotatably mounted to the central shaft 12 as shown in FIGS. 1 and 2 such that the annular collar 14 remains generally static relative to the rotation of the central shaft 12 when the central shaft is rotated by a drill. In one embodiment of this configuration, the annular collar 14 has an upper counter-bore 38 located within its upper surface 40, centered about the axial centerline 30 and adjacent the shaft aperture 28. The upper counter-bore 38 is configured to receive a thrust bearing 42. The thrust bearing 42 in one embodiment is an annular three piece thrust bearing having top 44 and bottom 46 washers and a middle bearing 48 sandwiched between the washers 44, 46. In other embodiments of the thrust bearing 42, the middle bearing 48 comprises a plurality of ball bearings contained within a ring (not shown), the ball bearings contacting the first and second washers 44, 46. In yet other embodiments of the thrust bearing 42, the middle bearing 48 comprises a plurality of roller bearings positioned radially within a ring (not shown), the roller bearings contacting the first and second washers 44, 46.

The opening 50 in the thrust bearing 42 should have a diameter at least as large as the shaft aperture 28 to permit the central shaft 12 to be positioned within the thrust bearing 42 when the thrust bearing is securely positioned in the upper counter-bore 38. A flange 52 radially extends from the central shaft 12 adjacent the annular collar 14 and frictionally contacts the washer 44 of the thrust bearing 42. When the central shaft 12 is rotated by a drill, the flange 52 rotates the washer 44 while the thrust bearing 42 functions to prevent the annular collar 14 which frictionally contacts washer 46 from also rotating.

In the static configuration, a frictional engagement may be used to maintain the axial position of the annular collar 14 about the central shaft 12. In one embodiment, the flange 52 in the central shaft 12 contacts the upper surface 40 of the annular collar 14 (or thrust bearing 42 within the upper counter-bore 38) to prevent the annular collar 14 from being displaced toward the drill bit end 18 of the central shaft 12. In other embodiments, the central shaft 12, has a circumferential groove 56 positioned adjacent the shaft aperture 28 at the lower surface 32 of the annular collar 14, and a C-clip 58 is positioned within the groove 56 to prevent the annular collar 14 from being displaced toward the cutting tool end 20 of the central shaft 12.

Figure 3:
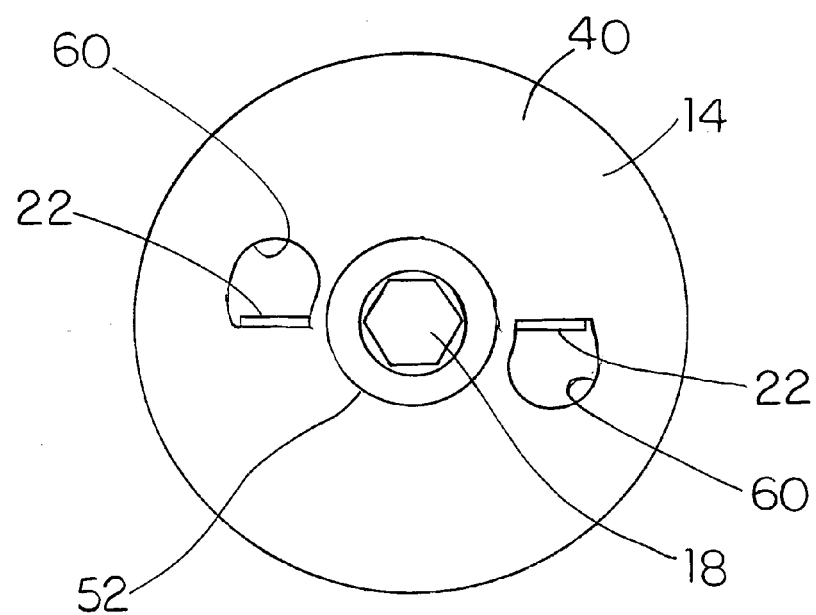
FIG. 3 is a top view of another version of the drill bit apparatus shown in FIG. 1.
Figure 8:
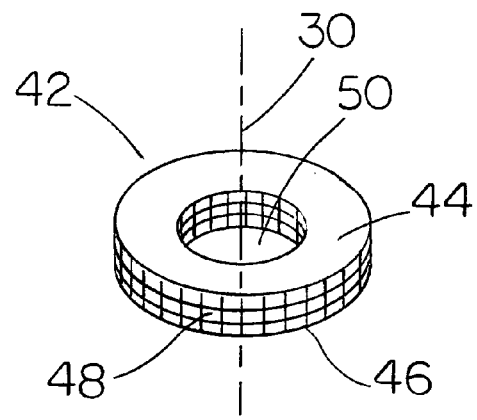
FIG. 8 is a perspective view of a thrust bearing.

In one embodiment, the annular collar 14 has at least one collar aperture 60 extending through the upper surface 40. In other embodiments, as shown in FIG. 3, the annular 14 collar has first and second collar apertures 60 extending through the upper surface 40. The collar apertures 60 may be sized to provide egress for wood chips (not shown) to exit when the drill bit apparatus 10 is in use. Alternatively, a user may use the collar apertures 60 to access wood chips and manually expel them through the lower surface 32 if chips become lodged within the annular collar 14 or lower counter bore 62.

In another embodiment, apertures 60 are filled with black epoxy to form a black spot or spots on collar 14. In both embodiments, apertures 60 readily indicate when collar 14 is stationary or rotating.

In one embodiment, the annular collar 14 has a lower counter bore 62 within the lower surface 32. The lower counter bore 62 is configured to receive the upper portion 64 of the cutting tool 22 as the upper portion extends radially from the central shaft 12, as described further below.

FIG. 4 shows a cross-sectional view of one embodiment of the drill bit apparatus 10 showing the relationship of component parts. The annular collar 14 is shown in cross-section with the thrust bearing 42 positioned within the upper counter-bore 38. The flange 52 abuts the thrust bearing 42. A C-clip 58 is positioned in the circumferential groove 56 to retain the annular collar 14 between the C-clip 58 and the flange 52. A cutting tool fastener 66 engages a countersunk securement aperture 68 in the central shaft 12 at the cutting tool end 20 thereof to secure the cutting tool 22 in a cutting tool slot 70 extending axially into the central shaft 12 at the cutting tool end 20.

FIG. 5 is a detail view of one embodiment of the central shaft 12. The central shaft 12 comprises a drill bit end 18 which is configured to be releasably secured within a chuck of a conventional drill or drill press (not shown). In one embodiment, the drill bit end 18 is generally circular in cross-section, and may be knurled about its exterior surface. In other embodiments, the drill bit end 18 is generally polygonal in cross-section. In yet other embodiments, the drill bit end 18 is generally hexagonal in cross-section.

The central shaft 12 also comprises a circumferential groove 56 located in spaced relation axially below a flange 52. The distance between the groove 56 and the flange 52 in one embodiment is about the thickness of the annular collar 14 from the upper surface 40 to the lower surface 32. In other embodiments, this distance is about the thickness from the upper surface 40 to the lower counter bore 62 in the lower surface 32. A C-clip 58 is positioned in the circumferential groove 56. A cutting tool slot 70 extends axially into the central shaft 12 at the cutting tool end 20. In one embodiment, the cutting tool slot 70 extends from the cutting tool end 20 to about the circumferential groove 56. The cutting tool slot 70 is configured to receive the cutting tool 22 therein. A countersunk securement aperture 68 is located near the cutting tool end 20 for aligning with a mounting aperture 72 in the cutting tool 22 (described below) and configured for receiving a cutting tool fastener 66 such as a threaded screw, bolt, pin, dowel or rivet therein to secure the cutting tool 22 to the central shaft 12.

In one embodiment, a reamed aperture 74 is located in the central shaft 12 in spaced relation axially above the countersunk securement aperture 68. In other embodiments, the reamed aperture 74 may receive a fastener 36 extending from an aligned radial aperture 34 in the annular collar 14 for a rigid mounting configuration of the annular collar 14 and the central shaft 12. In yet other embodiments, the reamed aperture 74 may receive a retention member 76, such as a pin, bolt, screw or rivet, that serves as the notch 78 in the cutting tool slot 70 described further below.

Figure 5A:
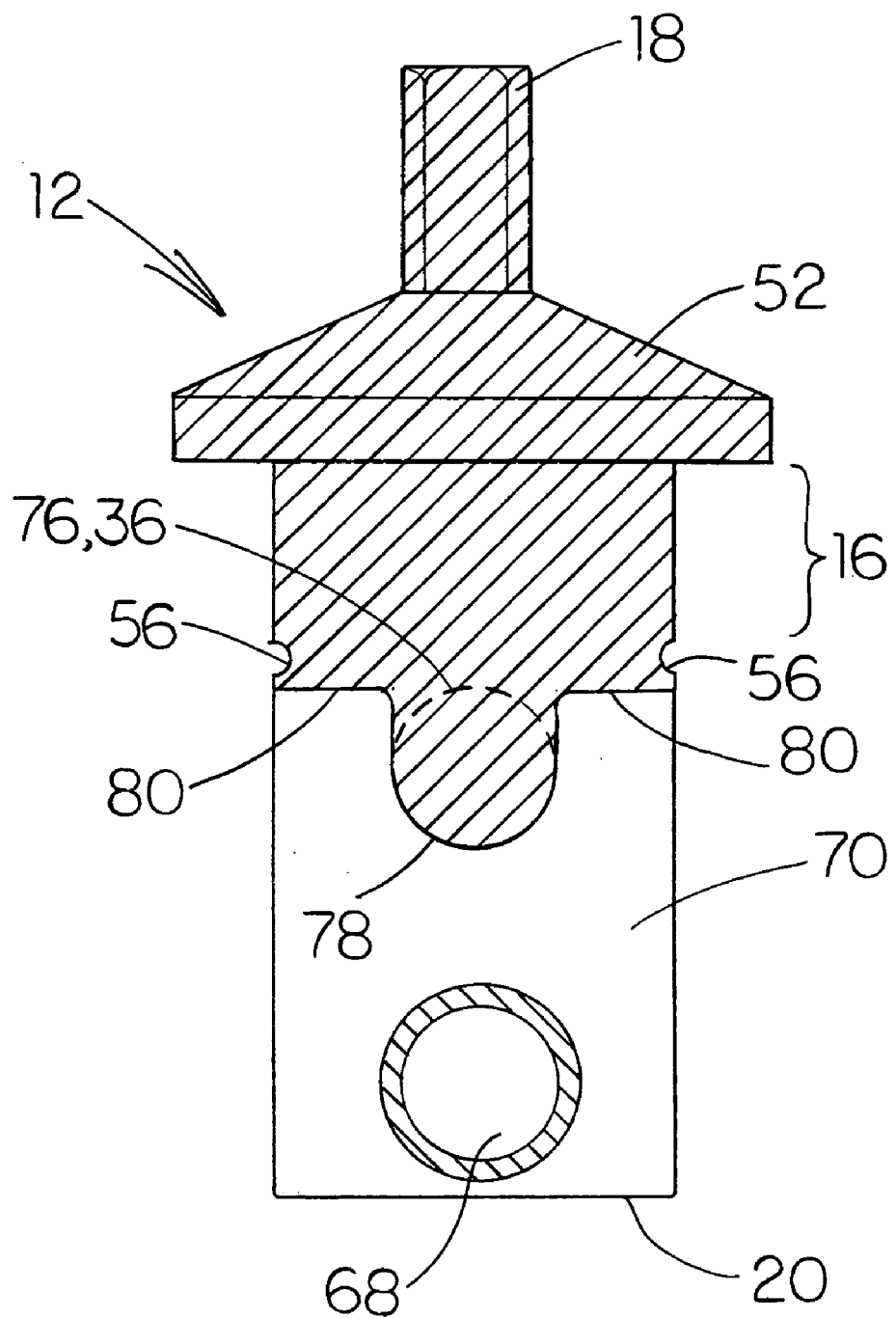
FIG. 5A is a side cross-sectional view of the cutting tool end of a central shaft detailing the interior of a cutting tool slot.

As shown in FIG. 5A, the cutting tool slot 70 further has a notch 78 extending generally axially downward from an upper end 80 of the cutting tool slot 70. In one embodiment, the notch 78 comprises radial fastener 36 or retention member 76 inserted within a reamed aperture 74 in the central shaft 12. In other embodiments, the notch 78 is contiguous with the upper end 80 of the cutting tool slot 70 and is configured to engage a slot 82 in the cutting tool 22 as described below. The notch 78 engaging the slot 82 in the cutting tool 22 prevents the cutting tool from tilting within the cutting tool slot 70 during use.

The cutting tool 22 has an upper portion 64 and a lower portion 84 that define a T-shaped spaded cutting tool 86, as shown in FIG. 7. In one embodiment, the cutting tool 22 is manufactured of a suitable tool steel. In other embodiments, the cutting tool 22 is manufactured of a suitable metal alloy. The cutting tool 22 has a mounting aperture 72 therethrough located along the axial centerline 30 for receiving a fastener 66 inserted through the countersunk securement aperture 68 in the central shaft 12. The engagement of the fastener 66, such as a screw, bolt, pin, dowel or rivet, with the aligned countersunk securement aperture 68 and the mounting aperture 72 in the cutting tool 22 secures the cutting tool within the cutting tool slot 70.

The upper portion 64 of the cutting 22 tool is generally wider than the lower portion 84. In one embodiment, the lower counter bore 62 in the lower surface 32 of the annular collar 14 receives the upper end 92 of the upper portion 64 of the cutting tool 22, a lower end 88 defining cutting tips 90 (described below) extending slightly below the lower surface 32 of the annular collar 14. The spaded cutting tool 86 in one embodiment has a thickness of about 3/16 inch. An upper end 92 of the upper portion 64 is inserted into the cutting tool slot 70 for securement with the cutting tool end 20 of the central shaft 12. In one embodiment, the upper end 92 of the upper portion 64 has a slot 82 for receiving the notch 78 in the cutting tool slot 70. When the cutting tool 22 is properly secured to the central shaft 12, the cutting tool is centrally positioned in alignment with the axial centerline 30.

The lower portion 84 of the cutting tool 22 defines a central bore cutter 94. The central bore cutter 94 is utilized to bore the center bore 96 (the deeper but narrower portion of the countersunk aperture 24 bored into a surface 26 by the drill bit apparatus 10). In one embodiment, the central bore cutter 94 defines one or more cutting tips 98. In other embodiments, the central bore cutter 94 comprises a pair of offset cutting tips 100 spaced apart from an inclined pointed cutting tip 102. In yet other embodiments, the pointed cutting tip 102 extends axially below the offset cutting tips 100. In yet other embodiments, the pointed cutting tip 102 is inclined from about 7 degrees to about 30 degrees from the axial centerline 30. The offset cutting tips 100 are positioned on opposite sides of the pointed cutting tip 102.

The width of the central bore cutter 94 in one embodiment is from about ½ inch to about 1 inch. In this embodiment, the width of the central bore cutter 94 is set to bore a center bore 96 that has a diameter from about ½ inch to about 1 inch. In this embodiment, the central bore cutter 94 extends axially from the cutting tool end 20 of the central shaft 12 sufficiently to extend a distance below the lower surface 32 of the annular collar 14 that is from about 1 inch to about 1½ inches. In other embodiments, the width of the central bore cutter 94 and the axial extension of central bore cutter 94 from annular collar 14 are chosen as desired.

The upper portion 64 of the cutting tool 22 defines a counter bore cutter 104. The counter bore cutter 104 is utilized to bore the counter bore 106 (the shallower but wider portion of the countersunk aperture 24 bored into a surface 26 by the drill bit apparatus 10). In one embodiment, the counter bore cutter 104 defines one or more cutting tips 90. In other embodiments, the counter bore cutter 104 comprises a pair of offset cutting tips 108 centrally spaced about said lower portion 84. The width of the counter bore cutter 104 in one embodiment is from about 1¼ inches to about 2 inches. In this embodiment, the width of the counter bore cutter 104 is set to bore a counter bore 106 that has a diameter from about 1¼ inches to about 2 inches. In this embodiment, the counter bore cutter 104 extends radially from the cutting tool end 20 of the central shaft 12 and has an axial length sufficient to extend a distance below the lower surface 32 of the annular collar 14 that is from about ⅛ inch to about ¼ inch. In other embodiments, the width of counter bore cutter 104 and the extension of counter bore cutter 104 from collar 14 are chosen as desired.

The offset cutting tips 100, the pointed tip 102, and the counter bore offset cutting tips 108 are easily sharpened by any known conventional sharpening means (not shown). Sharpening the cutting tips 90, 98 extends the life of the cutting tool 22.

In one embodiment, the central shaft 12 is manufactured of a suitable metal material. In other embodiments, the central shaft 12 is manufactured of aluminum. In yet other embodiments, the annular collar 14 is manufactured of any suitable plastic or metal. In yet other embodiments, the cutting tool 22 is manufactured of a hardened tool steel.

It will be appreciated that the drill bit apparatus 10 may be utilized to bore countersunk apertures 24 in several types of surfaces 26, limited only by the manufacturing material for the cutting tool 22 and its suitability for boring into various surface types. In one embodiment, the cutting tool 22 may be used to bore countersunk apertures 24 in surfaces 26 made of wood. In other embodiments, the cutting tool 22 may be used to bore countersunk apertures 24 in surfaces 26 made of masonry materials such as brick, ceramic, slate, cement, and paver stones.

In one embodiment, the specific dimensions of the cutting tool 22 determine the diameter and depth of the center bore 96 and the counter bore 106 of the countersunk aperture 24 to be bored into a surface 26. The offset counter bore cutting tips 108 located on the counter bore cutter 104 determine the diameter of the counter bore 106, and the depth of the counter bore 106 is determined by the distance the counter bore cutting tips 108 extend axially below the lower surface 32 of the annular collar 14. Similarly, the offset central bore cutting tips 100 located on the central bore cutter 94 determine the diameter of the center bore 96, and the depth of the center bore 96 is determined by the distance the offset cutting tips 100 extend axially from the cutting tool end 20 of the central shaft 12 below the lower surface 32 of the annular collar 14.

Figure 10:
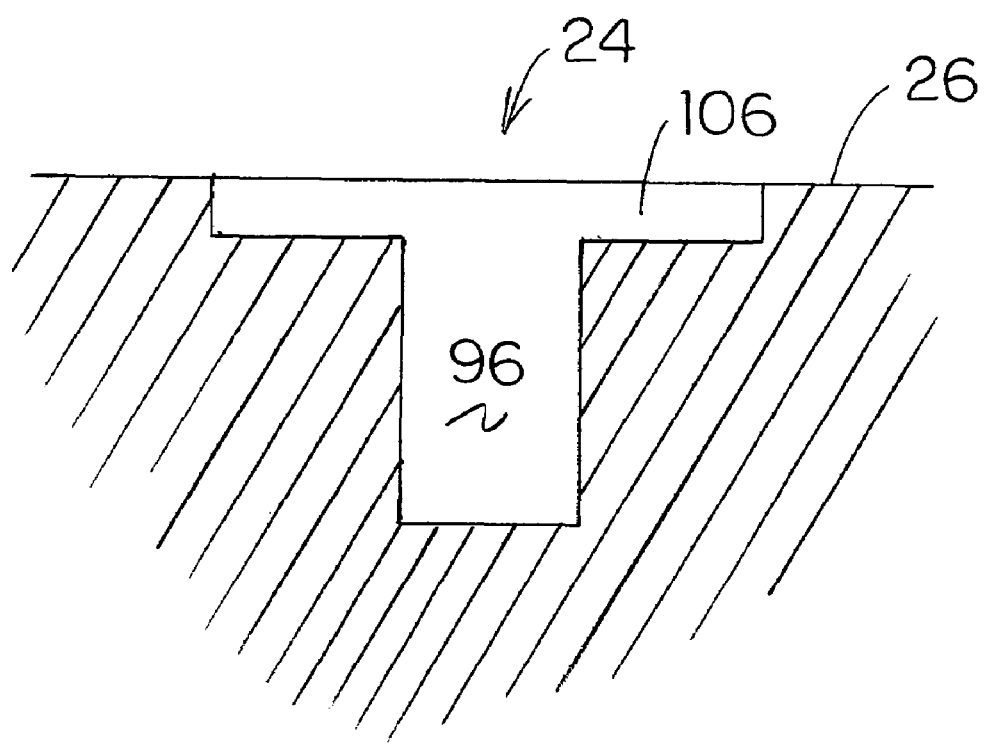
FIG. 10 is a cross-sectional view of a counter-bored aperture cut into a surface using the drill bit apparatus.

For example, in the swimming pool and spa industry, pool and spa covers are secured in place by a member connected to the periphery of the cover being inserted into an anchor secured within a surface 26. Generally, such anchors are T-shaped in side profile and are flush mounted within the surface into a countersunk aperture 24 such as shown in FIG. 10. Flush mounting of such anchors prevents tripping over an anchor extending above the surface level. Such anchors generally come in standard sizes, and thus the center bore 96 and the counter bore 106 of the countersunk aperture 24 would be uniform for a particular size anchor. A cutting tool 22 in one embodiment of the drill bit apparatus 10 may be specifically dimensioned for use in boring countersunk apertures 24 appropriate for one or more different standard sizes of anchors, for the pool and spa industry. The predetermined dimensions of the cutting tool 22 for this use serves to speed setup, while saving time and ensuring a plurality of uniform flush mount apertures 24 in a surface 26 adjacent a pool or spa. Other specific uses for the countersunk aperture 24 may likewise dictate the specific dimensions of the cutting tool 22 desired by the user of any embodiment of the drill bit apparatus 10 described herein, and such other uses are well within the skill of those of ordinary skill in the art.

It will be appreciated that the above description of various embodiments relates to the invention by way of example only. Many embodiments by way of variations and adaptations of the invention will become obvious to those skilled in the art, and such obvious variations and adaptations are intended to be within the scope of the invention and of the attached claims:

What is claimed is:

1. A drill bit apparatus comprising: a central shaft and an annular collar mounted on said central shaft, said central shaft being coaxially Positioned within said annular collar, said central shaft having a bit end and a cutting tool end, said annular collar being spaced between said bit end and said cutting tool end, said bit end configured for releasable securement in a chuck of a drill or drill press, said cutting tool end configured to securably receive a cutting tool therein, said cutting tool having an upper portion and a lower portion, said lower portion extending axially from said cutting tool end, and an upper portion extending radially from said cutting tool end, said lower portion comprising a central bore cutter essentially coaxial with said central shaft, said upper portion comprising a counter bore cutter having a width greater than said central bore cutter, said counter bore cutter extending below a lower surface of said annular collar a distance less than the distance that said central bore cutter extends below said lower surface, a flange radially extending from said central shaft, said flange frictionally engaging an upper surface of said annular collar, and a C-clip positioned within a circumferential groove on said central shaft spaced from said flange, said C-clip engaging said lower surface of said annular collar.

2. The apparatus of claim 1 wherein said annular collar further comprises an upper counter-bore within said upper surface centered on said axial centerline and a lower counter bore within said lower surface centered on said axial centerline, said upper counter bore configured to receive an annular thrust bearing therein for frictionally engaging said flange, said lower counter bore configured to receive said upper portion of said cutting tool.

3. The apparatus of claim 1 wherein said bit end is generally circular in cross section.

4. The apparatus of claim 3 wherein said bit end is knurled on its outer surface.

5. The apparatus of claim 1 wherein said bit end is generally multi-sided in cross section.

6. The apparatus of claim 5 wherein said bit end is generally hexagonal in cross section.

7. The apparatus of claim 1 wherein said annular collar further comprises an upper surface and at least one collar aperture extending through said upper surface to said lower surface of said annular collar.

8. The apparatus of claim 1 wherein said counter bore cutter extends below said lower surface a distance from about 1/8 inch to about 1/4 inch.

9. The apparatus of claim 1 wherein said central bore cutter extends below said lower surface a distance from about 1 inch to about 1 1/2 inches.

10. The apparatus of claim 1 wherein said cutting tool comprises a T-shaped spaded cutting tool, said upper portion having a width greater than the width of said lower portion.

11. The apparatus of claim 10 wherein said cutting tool has a thickness of about 3/16 inch.

12. A drill bit apparatus comprising: a central shaft and an annular collar mounted on said central shaft, said central shaft being coaxially positioned within said annular collar, said central shaft having a bit end and a cutting tool end, said annular collar being spaced between said bit end and said cutting tool end, said bit end configured for releaseable securement in a chuck of a drill or drill press, said cutting tool end configured to securably receive a cutting tool therein, said cutting tool comprising a lower portion extending axially from said cutting tool end and an upper portion extending radially from said cutting tool end, said lower portion comprising a central bore cutter essentially coaxial with said shaft, said upper portion comprising a counter bore cutter having a width greater than said central bore cutter, said counter bore cutter extending below a lower surface of said annular collar a distance less than the distance that said central bore cutter extends below said lower surface, said cutting tool comprises a T-shaped spaded cutting tool, said upper portion having a width greater than the width of said lower portion, said cutting tool further comprises a mounting aperture through said cutting tool and a slot formed in an upper end of said upper portion, said cutting tool end of said central shaft further comprising a cutting tool slot, a countersunk securement aperture and a notch, said cutting tool slot extending axially into said central shaft at said cutting tool end and being configured to receive said cutting tool at said upper portion, said countersunk securement aperture being reamed laterally through said central shaft at said cutting tool end and being aligned with said mounting aperture when said cutting tool is inserted in said cutting tool slot, a fastener engaging said cutting tool end and said cutting tool for securing said cutting tool in said cutting tool slot, said notch extending from an upper end of said cutting tool slot in spaced relation from said countersunk securement aperture along said axial centerline, said notch configured to be received within said slot in said cutting tool when said mounting aperture and said countersunk securement aperture are aligned.

13. The apparatus of claim 10 wherein said central bore cutter comprises a pair of offset cutting tips spaced from an inclined pointed cutting tip, said pointed cutting tip extending axially below said offset cutting tips from said lower portion.

14. The apparatus of claim 13 wherein said pointed cutting tip is inclined from about 7 degrees to about 30 degrees from said axial centerline.

15. The apparatus of claim 10 wherein said counter bore cutter comprises a pair of counter bore cutting tips centrally spaced about said lower portion.

16. The apparatus of claim 10 wherein said lower portion has a width from about ½ inch to about 1 inch.

17. The apparatus of claim 10 wherein said upper portion has a width from about 1½ inches to about 2 inches.

18. A drill bit apparatus comprising: a central shaft and an annular collar mounted on said central shaft, said central shaft being coaxially positioned within a shaft aperture within said annular collar, said central shaft having a bit end and a cutting tool end, said annular collar being spaced between said bit end and said cutting tool end, said bit end configured for releasable securement in a chuck of a drill or drill press, said cutting tool end configured to securably receive a cutting tool therein, said cutting tool comprising a T-shaped spaded cutting tool, said cutting tool defining a lower portion extending axially from said cutting tool end and an upper portion extending radially from said cutting tool end, said upper portion having a width greater than the width of said lower portion, said lower portion comprising a central bore cutter essentially coaxial with said shaft, said upper portion comprising a counter bore cutter having a width greater than said central bore cutter, said counter bore cutter extending below a lower surface of said annular collar a distance less than the distance than said central bore cutter extends below said lower surface, said cutting tool having a mounting aperture through said cutting tool and a slot formed in an upper end of said upper portion, said cutting tool end of said central shaft having a cutting tool slot, a countersunk securement aperture and a notch, said cutting tool slot extending axially into said central shaft at said cutting tool end and being configured to receive said cutting tool at said upper portion, said countersunk securement aperture extending laterally through said central shaft at said cutting tool end and being aligned with said mounting aperture when said cutting tool is inserted in said cutting tool slot, a fastener engaging said cutting tool end and said cutting tool for securing said cutting tool in said cutting tool slot, said notch extending from an upper end of said cutting tool slot in spaced relation from said countersunk securement aperture along said axial centerline, said notch configured to be received within said slot in said cutting tool when said mounting aperture and said countersunk securement aperture are aligned, a flange radially extending from said central shaft adjacent said portion, said flange frictionally engaging an upper surface of said annular collar adjacent said shaft aperture, a C-clip positioned within a circumferential groove in said central shaft spaced from said flange, said C-clip engaging said lower surface of said annular collar adjacent said shaft aperture.

19. A drill bit apparatus comprising: a central shaft and an annular collar mounted on said central shaft, said central shaft being coaxially positioned within a shaft aperture within said annular collar, said central shaft having a bit end and a cutting tool end, said annular collar being spaced between said bit end and said cutting tool end, said bit end configured for releasable securement in a chuck of a drill or drill press, said cutting tool end configured to securably receive a cutting tool therein, said cutting tool comprising a T-shaped spaded cutting tool, said cutting tool defining a lower portion extending axially from said cutting tool end and an upper portion extending radially from said cutting tool end, said upper portion having a width greater than the width of said lower portion, said lower portion comprising a central bore cutter essentially coaxial with said shaft, said upper portion comprising a counter bore cutter having a width greater than said central bore cutter, said counter bore cutter extending below a lower surface of said annular collar a distance less than the distance than said central bore cutter extends below said lower surface, said cutting tool having a mounting aperture through said cutting tool and a slot formed in an upper end of said upper portion, said cutting tool end of said central shaft having a cutting tool slot, a countersunk securement aperture and a notch, said cutting tool slot extending axially into said central shaft at said cutting tool end and being configured to receive said cutting tool at said upper portion, said countersunk securement aperture extending laterally through said central shaft at said cutting tool end and being aligned with said mounting aperture when said cutting tool is inserted in said cutting tool slot, a fastener engaging said cutting tool end and said cutting tool for securing said cutting tool in said cutting tool slot, said notch extending from an upper end of said cutting tool slot in spaced relation from said countersunk securement aperture along said axial centerline, said notch configured to be received within said slot in said cutting tool when said mounting aperture and said countersunk securement aperture are aligned, said central bore cutter comprising a pair of offset cutting tips spaced from an inclined pointed cutting tip, said pointed cutting tip extending axially below said offset cutting tips from said lower portion, said lower portion having a width from about ½ inch to about 1 inch, said upper portion having a width from about 1½ inches to about 2 inches, said counter bore cutter extending below said lower surface a distance from about ⅛ inch to about ¼ inch, said central bore cutter extending below said lower surface a distance from about 1 inch to about 1½ inches, a flange radially extending from said central shaft adjacent said portion, said flange frictionally engaging an upper surface of said annular collar adjacent said shaft aperture, a C-clip positioned within a circumferential groove in said central shaft spaced from said flange, said C-clip engaging said lower surface of said annular collar adjacent said shaft aperture, said annular collar further comprising an upper counter-bore within said upper surface centered on said axial centerline and a lower counter bore within said lower surface centered on said axial centerline, said upper counter bore configured to receive an annular thrust bearing therein for frictionally engaging said flange, said lower counter bore configured to receive said upper portion of said cutting tool.

20. A drill bit apparatus comprising: a central shaft and an annular collar mounted on said central shaft, said central shaft being coaxially positioned within a shaft aperture within said annular collar, said central shaft having a bit end and a cutting tool end, said annular collar being spaced between said bit end and said cutting tool end, said bit end configured for releasable securement in a chuck of a drill or drill press, said cutting tool end configured to securably receive a cutting tool therein, said cutting tool comprising a T-shaped spaded cutting tool, said cutting tool having a mounting aperture through said cutting tool, said cutting tool end of said central shaft having a cutting tool slot and a countersunk securement aperture, said cutting tool slot extending axially into said central shaft at said cutting tool end and being configured to receive said cutting tool, said countersunk securement aperture extending laterally through said central shaft at said cutting tool end and being aligned with said mounting aperture when said cutting tool is inserted in said cutting tool slot, a fastener engaging said cutting tool end and said cutting tool for securing said cutting tool in said cutting tool slot, said annular collar and said central shaft having a second radial aperture extending through said annular collar and said central shaft, and a fastener positioned within said second aperture for securing said annular collar and said central shaft together.

* * * * *